US011712114B2

(12) United States Patent
Lee et al.

(10) Patent No.: US 11,712,114 B2
(45) Date of Patent: Aug. 1, 2023

(54) FIXING ASSEMBLY

(71) Applicant: SEGOS CO., LTD., Incheon (KR)

(72) Inventors: Doo Myun Lee, Incheon (KR); Duc Hoi Kim, Incheon (KR); Sai Ryun Kim, Incheon (KR); Ro Hee Lee, Incheon (KR)

(73) Assignee: SEGOS CO., LTD., Incheon (KR)

( * ) Notice: Subject to any disclaimer, the term of this patent is extended or adjusted under 35 U.S.C. 154(b) by 0 days.

(21) Appl. No.: 17/618,961

(22) PCT Filed: Jun. 21, 2019

(86) PCT No.: PCT/KR2019/007528
§ 371 (c)(1),
(2) Date: Dec. 14, 2021

(87) PCT Pub. No.: WO2020/256192
PCT Pub. Date: Dec. 24, 2020

(65) Prior Publication Data
US 2022/0408920 A1    Dec. 29, 2022

(51) Int. Cl.
*A47B 96/07* (2006.01)
*A47L 15/50* (2006.01)
*F16B 12/26* (2006.01)
*F24C 15/16* (2006.01)

(52) U.S. Cl.
CPC ............ *A47B 96/07* (2013.01); *A47L 15/507* (2013.01); *F16B 12/26* (2013.01); *F24C 15/168* (2013.01)

(58) Field of Classification Search
CPC ........ F24C 15/16; F24C 15/168; A47B 88/43; A47B 88/423; A47B 96/07; F16B 12/26; A47L 15/507
See application file for complete search history.

(56) References Cited

U.S. PATENT DOCUMENTS

| 8,162,560 | B2* | 4/2012 | Wittgrebe | ............... F24C 15/16 248/220.21 |
| 8,573,720 | B2* | 11/2013 | Wittgrebe | ............. A47L 15/504 126/339 |
| 8,820,689 | B2* | 9/2014 | Reidt | .................... F24C 15/168 248/220.21 |
| 9,078,517 | B2* | 7/2015 | Rehage | ................. F24C 15/168 |
| 10,827,835 | B2* | 11/2020 | Kim | ....................... A47B 88/43 |
| 2001/0044992 | A1 | 11/2001 | Jahrling | |

(Continued)

FOREIGN PATENT DOCUMENTS

EP          1158185 A2    11/2001
KR    10-2011-0133596 A    12/2011

(Continued)

*Primary Examiner* — Patrick D Hawn
(74) *Attorney, Agent, or Firm* — Jae Youn Kim; NKL Law

(57) ABSTRACT

An embodiment of the present invention provides a fixing assembly comprising: a wire rack having a vertical frame and a horizontal frame; a slide rail having a fixed rail coupled to the wire rack, and a movable rail slidably arranged on the fixed rail; and a fixing means for coupling the fixed rail to the wire rack, wherein the fixing means comprises a first fixing clip provided on one side of the fixed rail, and a second fixing clip provided at the other side of the fixed rail, and the first fixing clip is laterally supported on the horizontal frame first, and then the second fixing clip is horizontally fixed to the horizontal frame.

8 Claims, 7 Drawing Sheets

(56) References Cited

U.S. PATENT DOCUMENTS

| | | | |
|---|---|---|---|
| 2005/0217501 A1* | 10/2005 | Babucke | F24C 15/168 99/450 |
| 2009/0127217 A1 | 5/2009 | Wittgrebe | |
| 2011/0113597 A1* | 5/2011 | Budde | F24C 15/168 24/457 |
| 2011/0123260 A1* | 5/2011 | Budde | F16B 7/0433 403/188 |
| 2012/0145856 A1 | 6/2012 | Reidt et al. | |
| 2012/0248955 A1* | 10/2012 | Rehage | F24C 15/168 312/334.1 |
| 2014/0334751 A1* | 11/2014 | Meyer | F24C 15/168 384/22 |
| 2016/0045951 A1 | 2/2016 | Maegawa et al. | |
| 2017/0303685 A1 | 10/2017 | Rehage et al. | |
| 2022/0160128 A1* | 5/2022 | Lee | F16B 7/0433 |

FOREIGN PATENT DOCUMENTS

| | | |
|---|---|---|
| KR | 2016-0065725 A | 6/2016 |
| KR | 10-1671161 B1 | 11/2016 |
| KR | 10-1826833 B1 | 2/2018 |
| KR | 10-2018-0126898 A | 11/2018 |
| WO | 2007090738 A1 | 8/2007 |
| WO | 2011023561 A1 | 3/2011 |

\* cited by examiner

FIXING ASSEMBLY

TECHNICAL FIELD

The present invention relates to a fixing assembly, and more particularly, a fixing assembly which, by using two-piece type fixing parts coupled to a slide rail, allows the slide rail to be firmly and quickly mounted on a wire rack through a simple operation and to be easily separated from the wire rack.

BACKGROUND ART

In general, a drawer assembly that is slidably coupled to draw an object in and out is installed in a mounting structure such as a dishwasher and an oven.

The drawer assembly is provided with a slide rail for allowing the object to be smoothly drawn in and out of the mounting structure. The slide rail may be provided with a rolling portion in the form of a ball or roller and moved smoothly when sliding so that user convenience can be improved.

In addition, the slide rail is fixed to the mounting structure through a fixing part, and a fixing force of the fixing part is weakened due to continuous movement of the slide rail, which often causes deformation and separation of the slide rail. Therefore, as a method for maintaining a high coupling force of the fixing part, a fixing part having a complex structure or a structure using a high elastic force has appeared, but there are problems in that a great force is required for coupling and manufacturing costs are increased.

In the case of the conventional fixing part using a complex structure or a high elastic force so as to improve a fixing force of the fixing part with respect to a slide rail, the fixing force is improved during coupling, but there is a problem in that an excessive force and effort are required when the fixing part is separated from the slide rail.

Accordingly, there is an increasing need for an easy clip which improves the convenience of a slide rail by allowing a user to easily separate and couple the rail from and to a wire rack of a mounting structure.

The structure of the easy clip needs to be simple and have high assembly convenience and needs to be easily mounted on and separated from the wire rack with less force.

RELATED ART DOCUMENTS

Korean Patent Publication No. 2016-0065725 (Jun. 9, 2016)

DISCLOSURE

Technical Problem

The present invention is directed to providing a fixing assembly which, by using two-piece type fixing parts coupled to a slide rail, allows the slide rail to be firmly and quickly mounted on a wire rack through a simple operation and to be easily separated from the wire rack.

Technical Solution

According to one embodiment of the present invention, a fixing assembly includes a wire rack including a vertical frame and a horizontal frame, a slide rail including a fixed rail coupled to the wire rack and a movable rail disposed on the fixed rail to be slidably movable, and a fixing part configured to couple the fixed rail to the wire rack, wherein the fixing part includes a first fixing clip provided at one side of the fixed rail and a second fixing clip provided at the other side of the fixed rail, and the first fixing clip is laterally supported on the horizontal frame, and then the second fixing clip is horizontally fixed to the horizontal frame.

The first fixing clip may include a first plate portion coupled to be in contact with one surface of the fixed rail, a first bent portion formed to be bent from one side of the first plate portion so as to support an inner side of an angular end portion of the horizontal frame, and a second bent portion which extends from the first bent portion and is bent and formed to support a lower side of the angular end portion.

The second bent portion may include a first support portion formed to fixedly support the lower side of the angular end portion, a convex portion formed in a shape that extends from the first support portion and is convex upward, and a guide portion which is formed to be inclined downward from the convex portion and guides an approach to the angular end portion.

The first fixing clip may further include a plate extension portion which is formed to extend from the first plate portion to one side, is positioned on the angular end portion, and is coupled to be in contact with the one surface of the fixed rail.

A shortest distance ($L1$) from an upper end of the convex portion to the plate extension portion may be formed to be less than a diameter ($L2$) of the angular end portion.

The second fixing clip may include a second plate portion positioned on the horizontal frame and coupled to be in contact with one surface of the fixed rail, a connection portion formed to be bent downward from one end of the second plate portion so as to support an outer side of an angular end portion of the horizontal frame, a second support portion positioned below the horizontal frame and formed to face the second plate portion in one direction from an end of the connection portion which is a direction in which a horizontal portion of the horizontal frame extends, an extension portion formed to extend from the second support portion so as to face the second plate portion, and an inclined portion formed in a direction from one side of the extension portion to the horizontal portion of the horizontal frame so as to be inclined upward.

The second fixing clip may further include a side extension portion formed to extend in the other direction from the end of the connection direction which is a direction opposite to the direction in which the horizontal portion extends, and the side extension portion may be formed integrally with the second support portion.

A vertical distance ($D1$) between an upper end of the inclined portion and the second plate portion may be formed to be less than a diameter ($D2$) of the horizontal portion.

The side extension portion may include a second upper plate portion and a second lower plate portion formed below the second upper plate portion, the second upper plate portion may be connected to an end of the connection portion, and the second lower plate portion may be connected to the second support portion.

When an external force is applied upward to the side extension portion, the side extension portion may be moved upward, and the second support portion, the extension portion, and the inclined portion formed integrally with the side extension portion may be moved downward using a point, at which the connection portion and the side extension portion are connected, as a fulcrum.

The side extension portion may further include a strength reinforcing portion which is formed to be bent upward, prevents deformation of the side extension portion, and serves as a stopper in contact with the fixed rail in a separating process.

Advantageous Effects

According to one aspect of the present invention, by using two-piece type fixing parts which are coupled to a slide rail and act complementarily to each other, the slide rail is fixed to a wire rack, thereby simplifying an assembly structure of a fixing assembly.

In addition, due to the simplified assembly structure, the fixing assembly of the present invention is coupled quickly and firmly in a coupling process, thereby improving coupling convenience.

The fixing assembly of the present invention has a structure that can be easily separated with a small force in a separating process so that separation convenience can be improved.

It should be understood that the effects of the present invention are not particularly limited to those described above, and the present invention includes all effects that can be deduced from the detailed description of the present invention or the configurations of the present invention described in the claims.

MODES OF THE INVENTION

Figure 1:
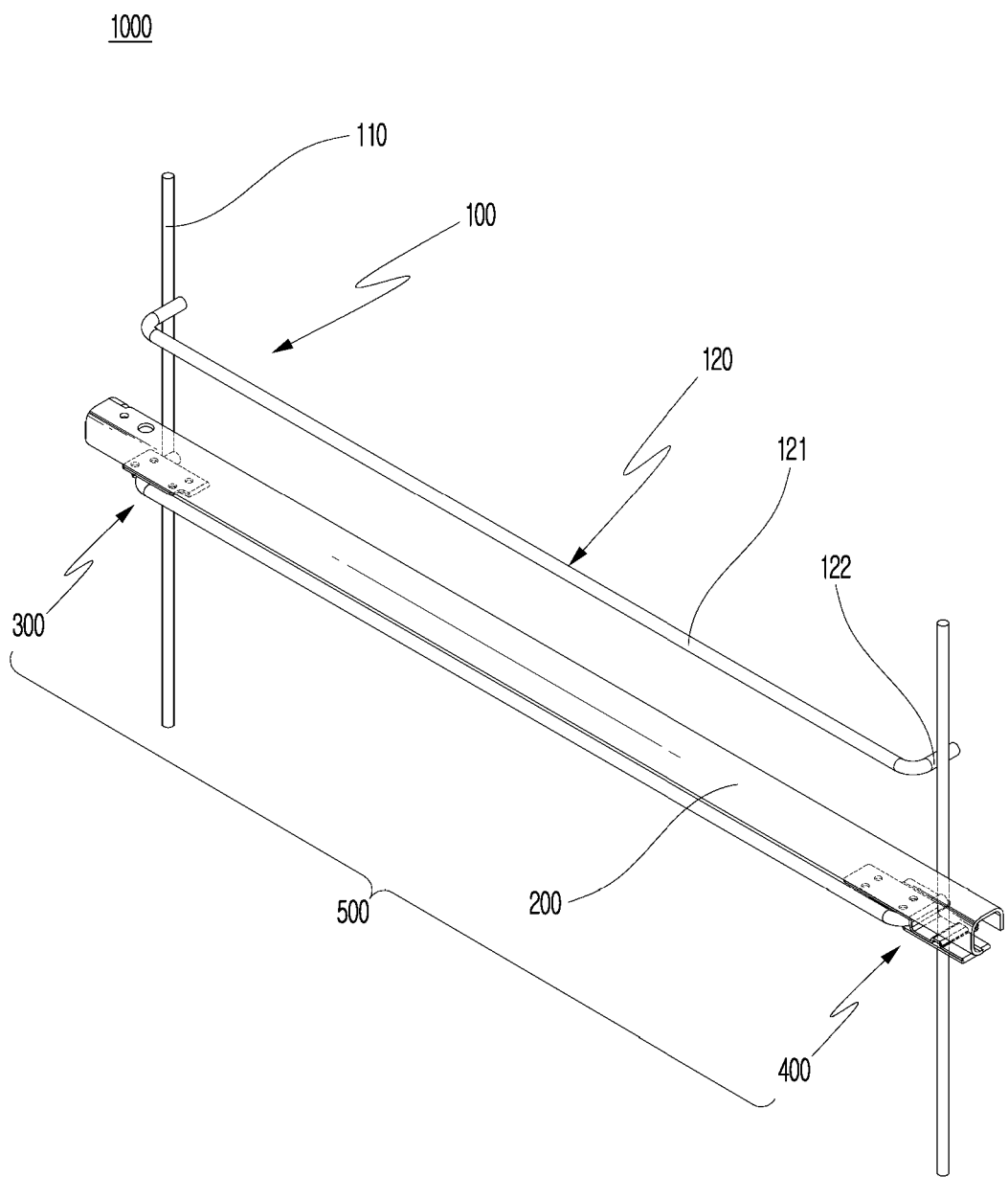
FIG. 1 is a perspective view of a fixing assembly according to one embodiment of the present invention.

Hereinafter, the present invention will be described with reference to the accompanying drawings. However, it is to be noted that the present invention is not limited to the embodiments but can be realized in various other ways. In the drawings, certain parts not directly relevant to the description are omitted to enhance the clarity of the present invention, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "indirectly connected or coupled to" another element via still another element. In addition, unless explicitly described to the contrary, "comprising" or "including" any components will be understood to imply the inclusion of other components rather than the exclusion of other components.

Hereinafter, embodiments of the present invention will be described in detail with reference to the accompanying drawings.

FIG. 1 is a perspective view of a fixing assembly according to one embodiment of the present invention.

Referring to FIG. 1, a fixing assembly 1000 of the present invention includes a wire rack 100 mounted inside a main body of a mounting structure, a slide rail 200 coupled to the wire rack 100 and disposed to be slidably movable, and a fixing part 500 formed to fix the slide rail 200 to the wire rack 100.

The fixing assembly 1000 is coupled to a mounting structure such as a dishwasher, an oven, or the like and serves to draw an object in and out in a sliding manner.

According to one embodiment, the fixing assembly 1000 of the present invention includes the wire rack 100 mounted inside the main body of the mounting structure.

More specifically, the wire rack 100 includes a pair of vertical frames 110 disposed vertically and at least one horizontal frame 120 configured to connect the vertical frames 110 horizontally. Accordingly, a load applied from the horizontal frame 120 may be transmitted to the main body of the mounting structure through the vertical frame 110.

The horizontal frame 120 may include a horizontal portion 121 and angular end portions 122 having an "L shape" formed at both ends of the horizontal portions 121. In this case, the angular end portions 122 may be coupled to the vertical frames 110 so that the horizontal frame 120 may be horizontally fixed to the vertical frame 110.

Meanwhile, the slide rail 200 that is slidably movable may be coupled to the wire rack 100.

More specifically, the slide rail 200 may include a fixed rail 210 fixed to the horizontal frame 120 and at least one movable rail 220 provided on the fixed rail 210 so as to be slidably movable. Accordingly, the slide rail 200 is formed to have a structure in which the at least one movable rail 220 slides to one side or the other side to draw an object in and out according to a user's need.

Meanwhile, the fixed rail 210 may be coupled to the wire rack 100 by the fixing part 500 including a first fixing clip 300 and a second fixing clip 400. The fixing part 500 may be made of a hard material such as a metal.

More specifically, the first fixing clip 300 and the second fixing clip 400 may be coupled to one end portion and the other end portion of the fixed rail 210 and coupled to the wire rack 100 so that the fixed rail 210 may be fixed to the wire rack 100.

That is, the fixed rail 210 is coupled and fixed to the wire rack 100 by the first fixing clip 300 and the second fixing clip 400 which have different structures to act complementarily to each other, and the movable rail 220 is formed on the fixed rail 210 to be slidably movable.

Figure 2A:
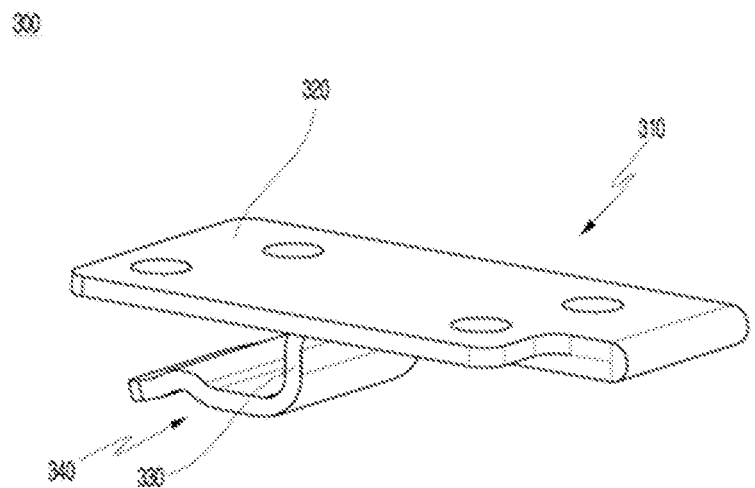
FIGS. 2A-2C show perspective views and a front view of a first fixing clip according to one embodiment of the present invention.
Figure 2B:
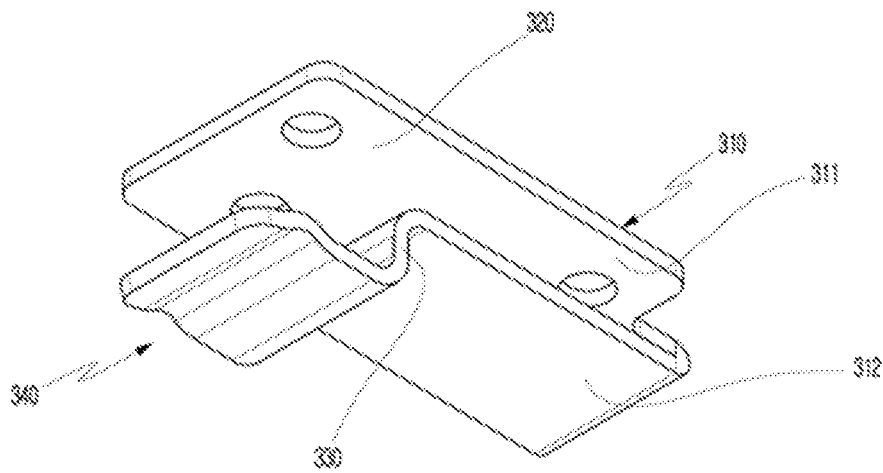
Figure 2C:
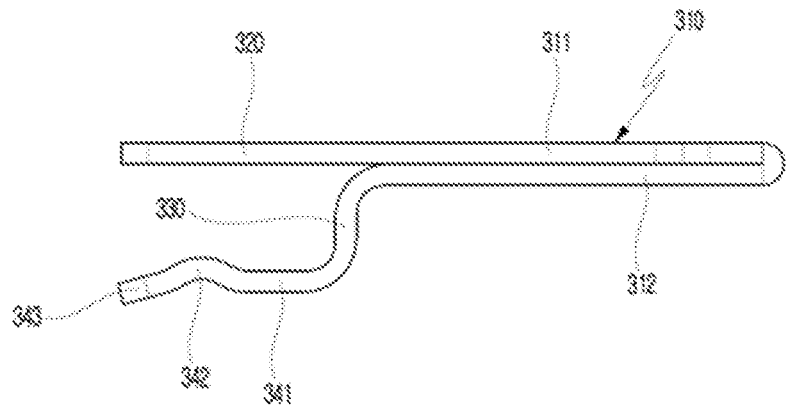
Figure 3A:
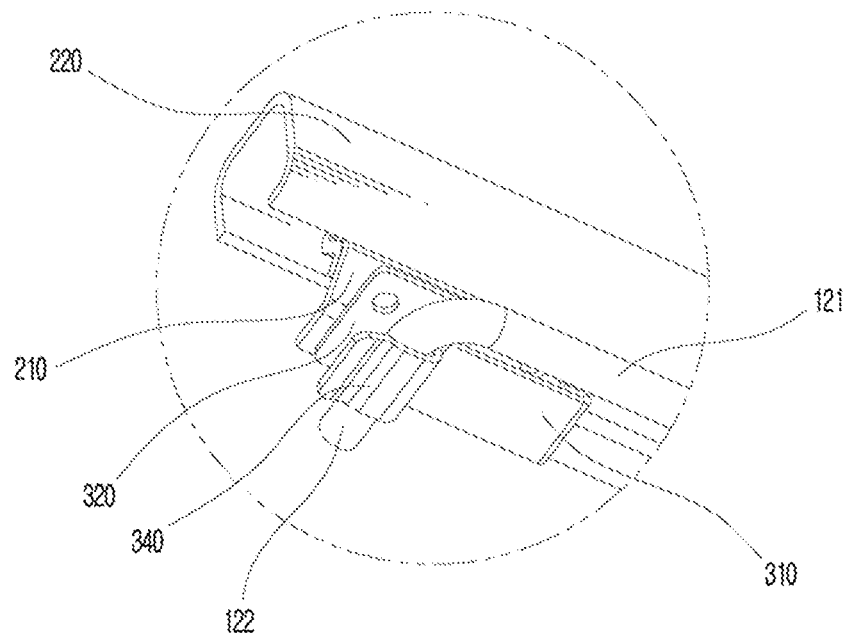
FIGS. 3A-3B illustrate the first fixing clip coupled to a wire rack and a slide rail according to one embodiment of the present invention.
Figure 3B:
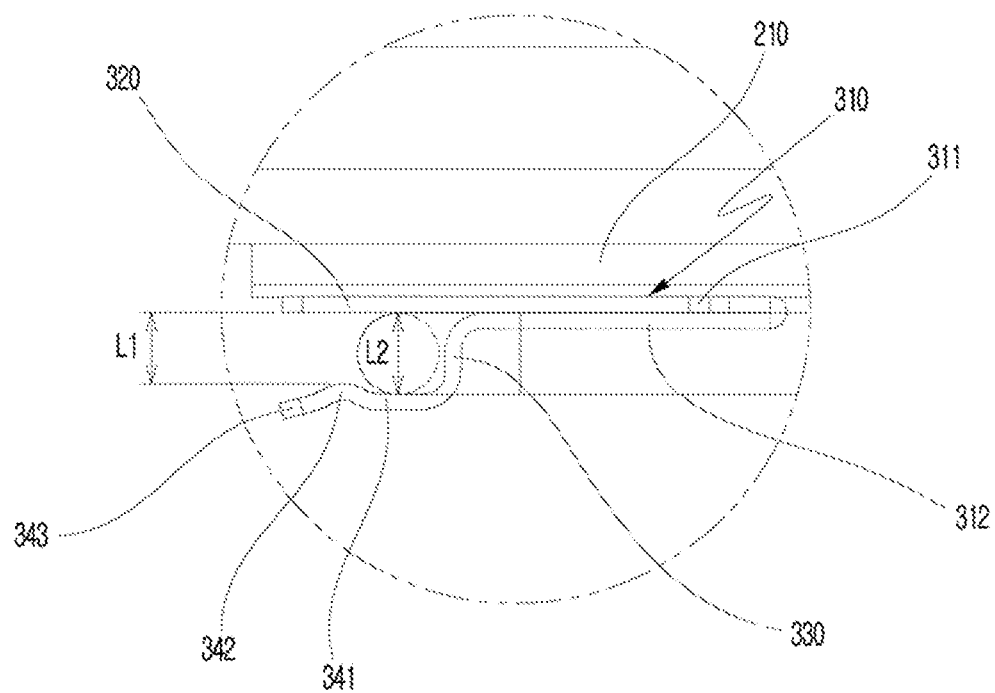

FIGS. 2A-2C perspective views and a front view of the first fixing clip according to one embodiment of the present invention, and FIGS. 3A-3B illustrate the first fixing clip coupled to the wire rack and the slide rail according to one embodiment of the present invention.

Referring to FIGS. 2A-2C and 3A-3B, the first fixing clip 300 includes a first plate portion 310, a plate extension portion 320, a first bent portion 330, and a second bent portion 340.

More specifically, the first fixing clip 300 includes the first plate portion 310 which is made of a hard material such as a metal and is coupled to the fixed rail 210 through welding, rivets, bolts, or the like in contact with one surface of the fixed rail 210. That is, one surface of the fixed rail 210 is seated on and coupled to an upper surface of the first plate portion 310 to form an integral structure.

According to one embodiment, the first fixing clip 300 may include the first bent portion 330, which is formed integrally with the first plate portion 310 at one side of the first plate portion 310 to be bent and formed to support an inner side of the angular end portion 122, and the second bent portion 340 which extends from the first bent portion 330 to be bent and formed to support a lower side of the angular end portion 122.

In this case, the fixed rail 210, the first bent portion 330, and the second bent portion 340 may be formed to form an approximately "⊏" shape. The first fixing clip 300 may be fixedly supported on the angular end portion 122 through a space in the "⊏" shape.

Meanwhile, the first fixing clip 300 may further include the plate extension portion 320 extending from the first plate portion 310 to one side.

In this case, the plate extension portion 320, the first bent portion 330, and the second bent portion 340 may be formed to form an approximately "⊏" shape. The first fixing clip 300 may be fixedly supported on the angular end portion 122 through a space in the "⊏" shape. In addition, the plate extension portion 320 may be coupled to the fixed rail 210 through welding, rivets, bolts, or the like in contact with one surface of the fixed rail 210. Accordingly, since the horizontal frame 120 is not in direct contact with the fixed rail 210, it is possible to prevent damage to the fixed rail 210 due to continuous use.

Meanwhile, the first plate portion 310 may include a first upper plate portion 311 and a first lower plate portion 312 formed below the first upper plate portion 311, the plate extension portion 320 may be formed to extend from the first upper plate portion 311, and the first bent portion 330 may be formed to be bent from the first lower plate portion 312. In this case, the first upper plate portion 311 and the first lower plate portion 312 may be formed to be in surface contact with each other or may be formed to have a small gap.

In addition, the second bent portion 340 may include a first support portion 341 formed to fixedly support the lower side of the angular end portion 122, a convex portion 342 which extends from the first support portion 341 and is formed to be convex upward, and a guide portion 343 which is formed to be inclined downward from the convex portion 342 and guides an approach to the angular end portion 122.

According to one embodiment, the shortest distance L1 from an upper end of the convex portion 342 to the plate extension portion 320 may be formed to be less than a diameter L2 of the angular end portion 122.

Accordingly, the convex portion 342 may serve as a locking protrusion when coupled to the angular end portion 122. That is, when a user applies a predetermined force, the convex portion 342 may be pushed downward by the angular end portion 122, and thus, the first fixing clip 300 may be coupled to the angular end portion 122. After the first fixing clip 300 is coupled, the convex portion 342 serves to prevent lateral separation and fixedly supports the angular end portion 122 together with the first support portion 341, the first bent portion 330, and the plate extension portion 320.

The guide portion 343 is formed to be inclined downward from the convex portion 342 and serves to primarily guide coupling when the first fixing clip 300 is coupled to the angular end portion 122. In addition, due to a shape thereof being inclined downward, the guide portion 343 guides an approach to the convex portion 342 and the first support portion 341 when coupled to the angular end portion 122, and thus, even when the user does not visually check that a process of the coupling is preferably performed, the user can recognize the process. Therefore, the guide portion 343 enables quick and easy coupling.

Figure 4A:
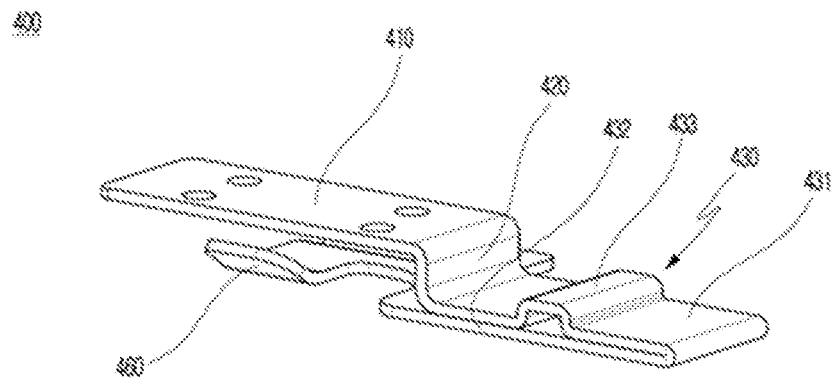
FIGS. 4A-4C show perspective views and a front view of a second fixing clip according to one embodiment of the present invention.
Figure 4B:
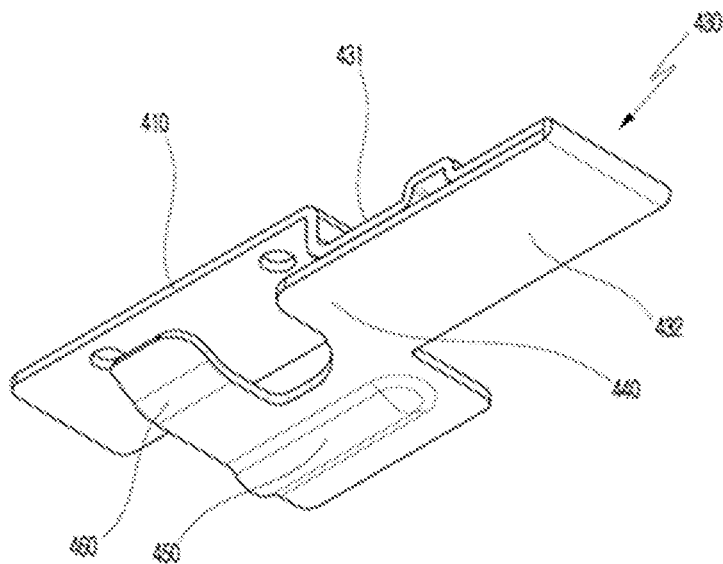
Figure 4C:
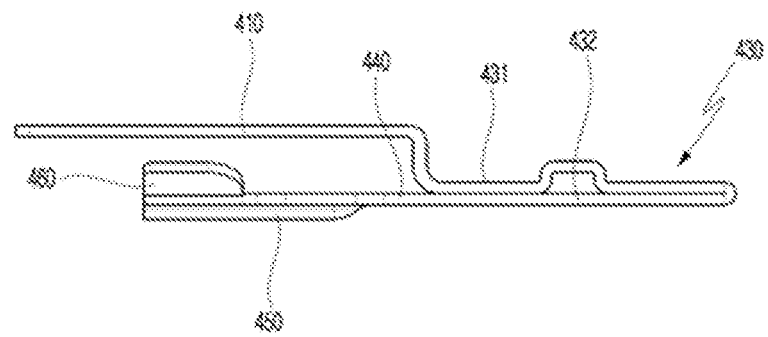
Figure 5A:
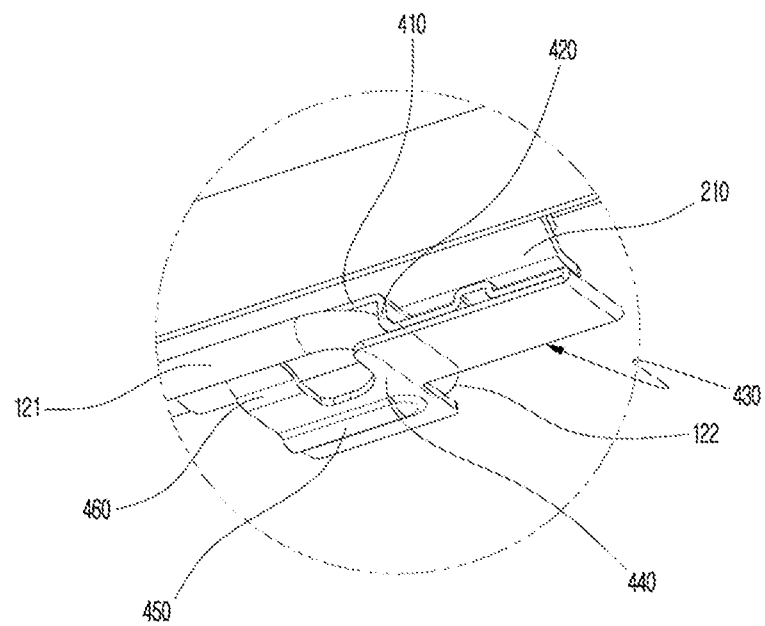
FIGS. 5A-5B illustrate the second fixing clip coupled to the wire rack and the slide rail according to one embodiment of the present invention
Figure 5B:
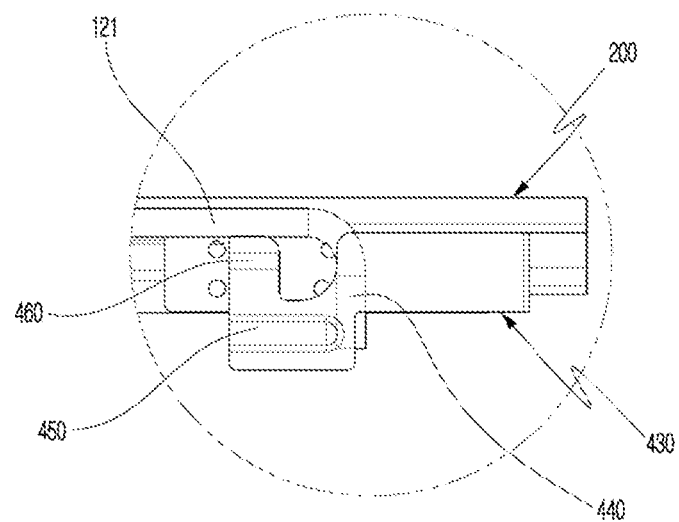

FIGS. 4A-4C show perspective views and a front view of the second fixing clip according to one embodiment of the present invention, and FIG. 5 FIGS. 5A-5B illustrate the second fixing clip coupled to the wire rack and the slide rail according to one embodiment of the present invention.

Referring to FIGS. 4A-4C and 5A-5B, the second fixing clip 400 includes a second plate portion 410, a connection portion 420, a side extension portion 430, a second support portion 440, an extension portion 450, and an inclined portion 460.

More specifically, the second fixing clip 400 includes the second plate portion 410 which is made of a hard material such as a metal and coupled to the fixed rail 210 through welding, rivets, bolts, or the like in contact with one surface of the fixed rail 210. That is, one surface of the fixed rail 210 is seated on and coupled to an upper surface of the second plate portion 410 to form an integral structure. In addition, after being coupled to the horizontal frame 120, the second plate portion 410 is positioned on the horizontal frame 120 (more specifically, on the angular end portion 122).

After being coupled to the horizontal frame 120, the second support portion 440 is positioned below the horizontal frame 120 (more specifically, below the angular end portion 122) to support a lower end of the angular end portion 122. That is, the second support portion 440 is formed to be parallel to the second plate portion 410 in one direction from the connection portion 420, that is, in a direction in which the horizontal portion 121 extends.

The connection portion 420 is formed to be bent downward from one end of the second plate portion 410 and connects the second plate portion 410 and the second support portion 440. Accordingly, the second fixing clip 400 is formed such that, after being coupled to the horizontal frame 120, the second plate portion 410, the second support portion 440, and the connection portion 420 surround the angular end portion 122. In this case, preferably, the connection portion 420 is disposed outside the angular end portion 122 and configured to connect the second plate portion 410 and the second support portion 440.

Meanwhile, the side extension portion 430 is formed to extend in the other direction from the connection portion 420, that is, in a direction opposite to the direction in which the horizontal portion 121 extends. That is, the side extension portion 430 may be formed integrally with the second support portion 440 formed in one direction from the connection portion 420, that is, in the direction in which the horizontal portion 121 extends.

More specifically, the side extension portion 430 may include a second upper plate portion 431 and a second lower plate portion 432 formed below the second upper plate portion 431. The second upper plate portion 431 may be formed to extend in the other direction from the connection portion 420, that is, in a direction opposite to the direction in which the horizontal portion 121 extends, and the second lower plate portion 432 may be formed integrally with the second support portion 440 formed in one direction from the connection portion 420, that is, in the direction in which the horizontal portion 121 extends. That is, the second upper plate portion 431 may be formed to be connected to an end of the connection portion 420, and the second lower plate portion 432 may be formed to be connected to the second support portion 440. The second upper plate portion 431 and the second lower plate portion 412 may be formed to be in surface contact with each other or may be formed to have a small gap.

In this case, the second upper plate portion 431 may be provided with a strength reinforcing portion 433 bent upward. The strength reinforcing portion 433 prevents deformation of the side extension portion 430 due to continuous use, and as will be described below, the strength reinforcing portion 433 serves as a stopper in contact with the slide rail 200 in a separating process of the second fixing clip 400.

The side extension portion 430 does not serve to directly engage in coupling in a process of being coupled to the horizontal frame 120, and as will be described below, the side extension portion 430 serves to allow separation from the horizontal frame 120 to be easily performed with less force using a principle of a lever in a separating process after coupling.

The extension portion 450 is formed to extend from the second support portion 440 so as to face the second plate portion 410. That is, the extension portion 450 is formed in a direction in which the horizontal portion 121 extends from the angular end portion 122.

In addition, the inclined portion 460 is formed in a direction from one side of the extension portion 450 to the horizontal portion 121 so as to be inclined upward. The inclined portion 460 may be formed to have elasticity.

In this case, a vertical distance D1 between an upper end of the inclined portion 460 and the second plate portion 410 may be formed to be less than a diameter D2 of the horizontal portion 121. Accordingly, the inclined portion 460 may serve as a locking portion in a process of being coupled to the horizontal frame 120 as will be described below.

When the second fixing clip 400 is mounted on the horizontal frame 120, the second fixing clip 400 is horizontally moved toward the horizontal frame 120. Accordingly, an external force is applied such that the second fixing clip 400 comes into contact with the angular end portion 122, and in this case, the horizontal portion 121 and the inclined portion 460 come into contact with each other. Thereafter, when an external force is continuously applied, the inclined portion 460 is elastically deformed to be opened downward. When the second fixing clip 400 passes through the horizontal portion 121 and comes into contact with the angular end portion 122, the inclined portion 460 is restored to be inclined upward again.

After the inclined portion 460 is restored, one end of the inclined portion 460 and the horizontal portion 121 are in contact with each other. That is, after the second fixing clip 400 is mounted on the horizontal frame 120, one end of the inclined portion 460 and an outer peripheral surface of the horizontal portion 121 are in contact with each other. Accordingly, the second fixing clip 400 may be easily mounted on the horizontal frame 120 due to elastic deformation of the inclined portion 460. After the second fixing clip 400 is mounted on the horizontal frame 120, the second fixing clip 400 is firmly and fixedly supported on the horizontal frame 120 unless there is a separate operation for separation. Therefore, according to the application of the present invention, the second fixing clip 400 can be easily and reliably coupled to the horizontal frame 120.

Figure 6:
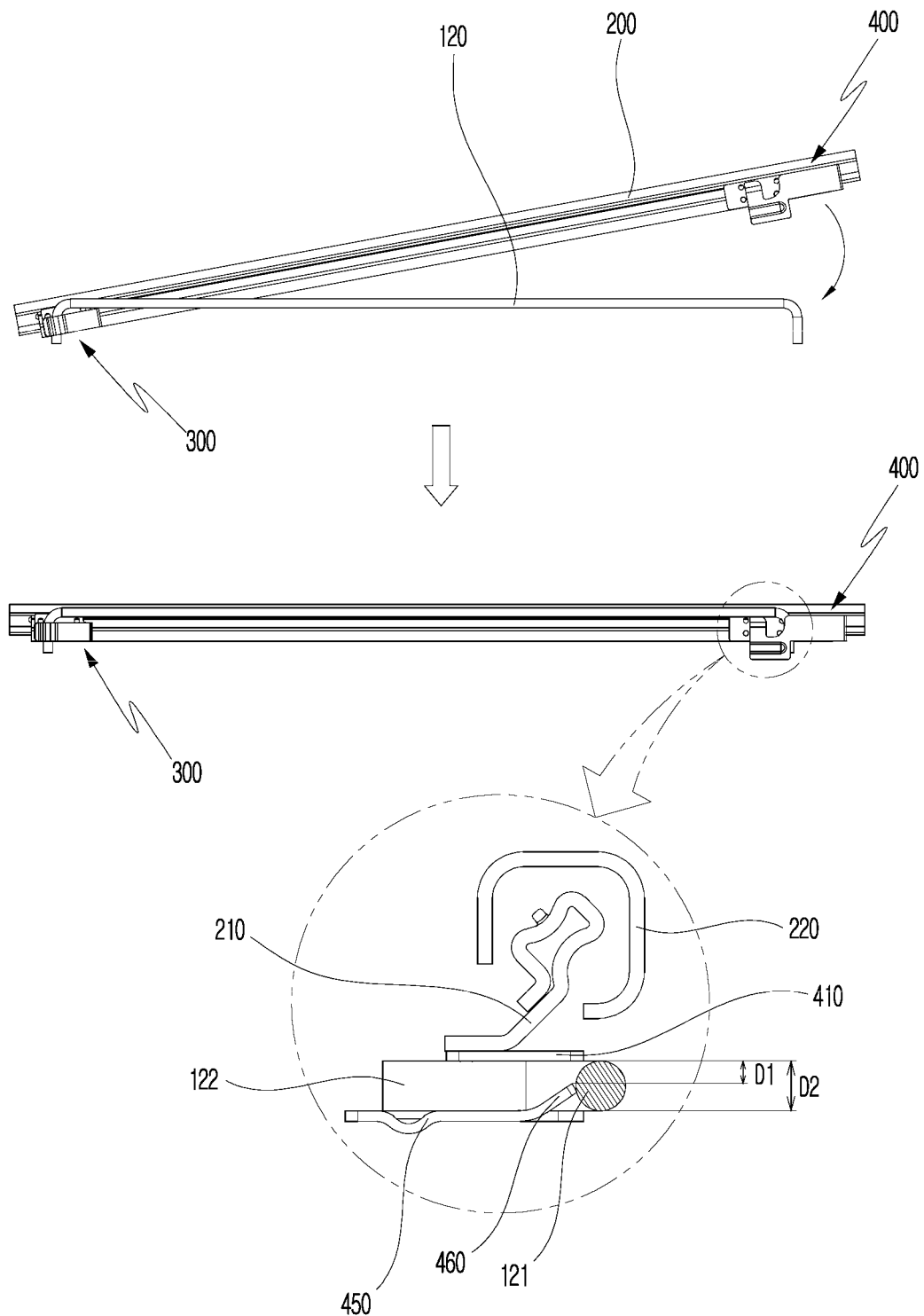
FIG. 6 shows usage state views illustrating a coupling process of the second fixing clip according to one embodiment of the present invention.
Figure 7:
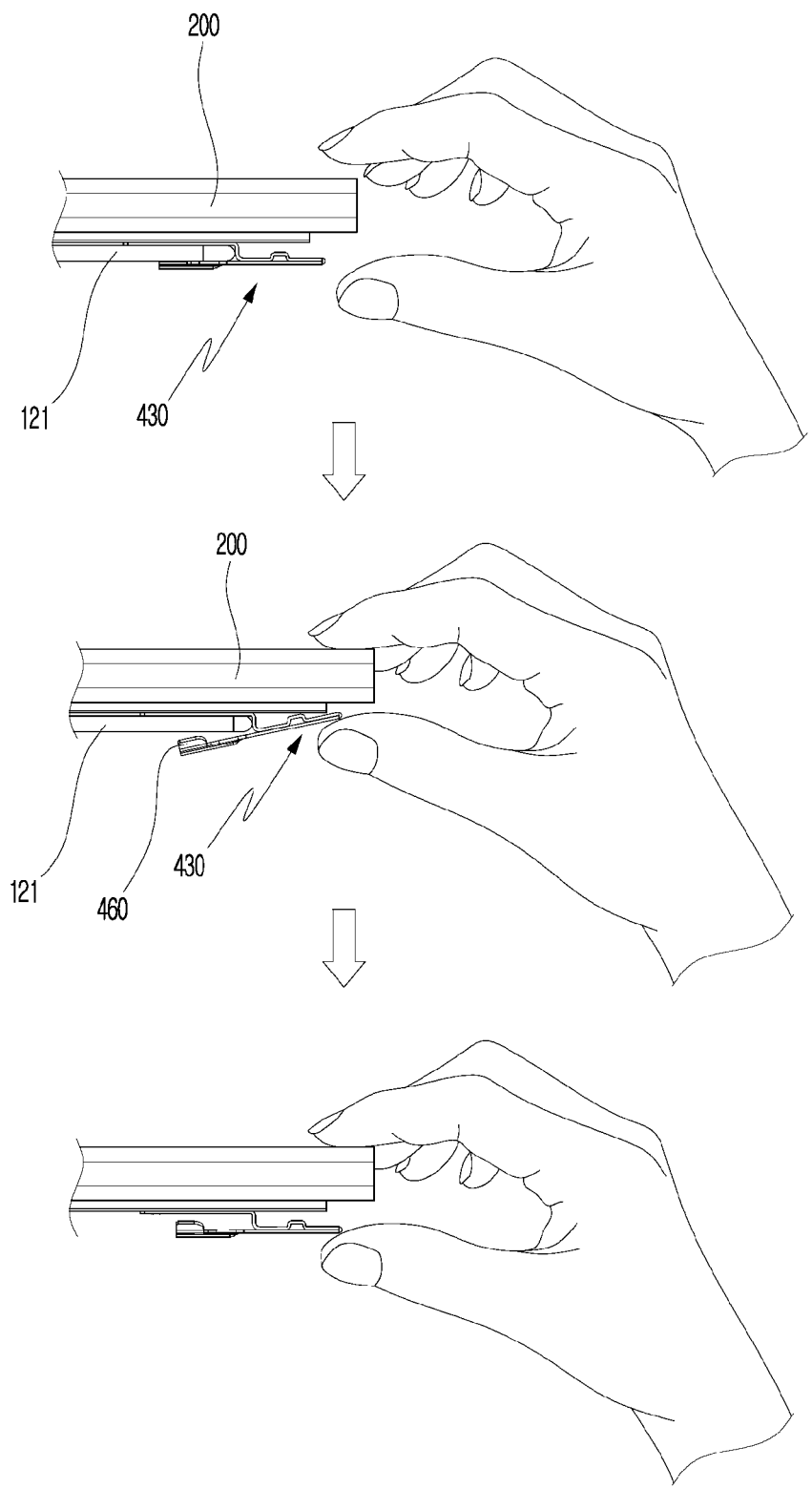
FIG. 7 shows usage state views illustrating a separating process of the second fixing clip according to one embodiment of the present invention.

FIG. 6 shows usage state views illustrating a coupling process of the second fixing clip according to one embodiment of the present invention, and FIG. 7 shows usage state views illustrating a separating process of the second fixing clip according to one embodiment of the present invention.

A process of coupling the fixing part 500 coupled to the slide rail 200 to the wire rack 100 will be described with reference to FIG. 6.

First, the first fixing clip 300 coupled to one end portion of the fixed rail 210 is fixedly supported on the angular end portion 122 formed at one end of the horizontal frame 120, and the second fixing clip 400 coupled to the other end portion of the fixed rail 210 is horizontally moved about the fixedly supported first fixing clip 300 and coupled to the angular end portion formed at the other end of the horizontal frame 120. In this case, the inclined portion 460 of the second fixing clip 400 and the horizontal portion 121 of the horizontal frame 120 come into contact with each other, and when an external force is continuously applied, the inclined portion 460 is elastically deformed downward. Thereafter, when the second fixing clip 400 passes through the horizontal portion 121 and comes into contact with the angular end portion 122, the inclined portion 460 is restored upward again.

That is, in the process of the coupling, the inclined portion 460 serves as a locking portion and an approach guide, and after the coupling, the inclined portion 460 serves to prevent separation. Accordingly, in a state in which there is no artificial external force, the second fixing clip 400 may be firmly and fixedly supported on the horizontal frame 120.

A process of separating the fixing part 500 coupled to the slide rail 200 from the wire rack 100 will be described with reference to FIG. 7.

First, when a user gripes the slide rail 200 coupled to the wire rack 100 and the side extension portion 430 provided to be parallel to the slide rail 200 with his or her fingers and applies an external force, the side extension portion 430 formed in a beam shape is moved upward. In this case, the side extension portion 430 is moved until the strength reinforcing portion 433 comes into contact with the slide rail 200.

Accordingly, the second support portion 440, the extension portion 450, and the inclined portion 460 formed integrally with the side extension portion 430 are moved downward according to a principle of a lever by using a point, at which the connection portion 420 and the side extension portion 430 are connected, as a fulcrum.

That is, the inclined portion 460 may no longer be in contact with the horizontal portion 121 and may be positioned below the horizontal portion 121, and the second fixing clip 400 may be easily separated horizontally by the user.

According to the fixing part 500 according to the present invention, lateral separation is prevented by the first bent portion 330 of the first fixing clip 300 and the connection portion 420 of the second fixing clip 400, vertical separation is prevented by the plate extension portion 320 and the first support portion 341 of the first fixing clip 300 and the second plate portion 410 and the second support portion 440 of the second fixing clip 400, and horizontal separation is prevented by the first bent portion 330 of the first fixing clip 300 and the inclined portion 460 of the second fixing clip 400, and thus the slide rail 200 may be firmly and fixedly supported on the wire rack 100.

In addition, since horizontal separation of the inclined portion 460 can be easily performed according to a principle of a lever due to a configuration of the side extension portion 430 during separation, both a coupling process and a separating process can be easily performed.

Although the embodiments of the present invention have been described for illustrative purposes, those skilled in the art will appreciate that various modifications, additions and substitutions are possible without departing from the scope and spirit of the present invention. Therefore, the above-described embodiments of the present invention are merely exemplary in all aspects and should not be construed to be limited. For example, each component described as a single type can be implemented in a distributed manner. Likewise, components described to be distributed can be implemented in a combined manner.

The scope of the present invention is defined by the appended claims, and all changes or modifications derived from the meaning and scope of the claims and their equivalents should be construed as being included within the scope of the present invention.

DESCRIPTIONS OF REFERENCE NUMERALS

1000: fixing assembly
100: wire rack
110: vertical frame
120: horizontal frame
121: horizontal portion
122: angular end portion
200: slide rail
210: fixed rail
220: movable rail
300: first fixing clip
310: first plate portion
320: plate extension portion
330: first bent portion
340: second bent portion
400: second fixing clip
410: second plate portion
420: connection portion
430: side extension portion
440: second support portion
450: extension portion
460: inclined portion
500: fixing part

The invention claimed is:

1. A fixing assembly comprising:
a wire rack including a vertical frame and a horizontal frame;
a slide rail including a fixed rail coupled to the wire rack and a movable rail disposed on the fixed rail to be slidably movable; and
a fixing part configured to couple the fixed rail to the wire rack,
wherein:
the fixing part includes a first fixing clip provided at one side of the fixed rail and a second fixing clip provided at the other side of the fixed rail;
the first fixing clip is laterally supported on the horizontal frame, and then the second fixing clip is horizontally fixed to the horizontal frame; and
the second fixing clip includes:
a second plate portion positioned on the horizontal frame and coupled to be in contact with one surface of the fixed rail;
a connection portion formed to be bent downward from one end of the second plate portion so as to support an outer side of an angular end portion of the horizontal frame;
a second support portion positioned below the horizontal frame and formed to face the second plate portion from an end of the connection portion;
an extension portion formed to extend from the second support portion so as to face the second plate portion;
an inclined portion formed in a direction from one side of the extension portion to the horizontal portion of the horizontal frame so as to be inclined upward; and
a side extension portion formed to extend from an end of the connection portion,
wherein the side extension portion is formed integrally with the second support portion, and
wherein, when an external force is applied upward to the side extension portion, the side extension portion is moved upward, and the second support portion, the extension portion, and the inclined portion formed integrally with the side extension portion are moved downward using a point, at which the connection portion and the side extension portion are connected, as a fulcrum.

2. The fixing assembly of claim 1, wherein the first fixing clip includes:
a first plate portion coupled to be in contact with one surface of the fixed rail;
a first bent portion formed to be bent from one side of the first plate portion so as to support an inner side of an angular end portion of the horizontal frame; and
a second bent portion which extends from the first bent portion and is bent and formed to support a lower side of the angular end portion.

3. The fixing assembly of claim 2, wherein the second bent portion includes:
a first support portion formed to fixedly support the lower side of the angular end portion;
a convex portion formed in a shape that extends from the first support portion and is convex upward; and
a guide portion which is formed to be inclined downward from the convex portion and guides an approach to the angular end portion.

4. The fixing assembly of claim 3, wherein the first fixing clip further includes a plate extension portion which is formed to extend from the first plate portion to one side, is positioned on the angular end portion, and is coupled to be in contact with the one surface of the fixed rail.

5. The fixing assembly of claim 4, wherein a shortest distance (L1) from an upper end of the convex portion to the plate extension portion is formed to be less than a diameter (L2) of the angular end portion.

6. The fixing assembly of claim 1, wherein a vertical distance (D1) between an upper end of the inclined portion and the second plate portion is formed to be less than a diameter (D2) of the horizontal portion.

7. The fixing assembly of claim 6, wherein:
the side extension portion includes a second upper plate portion and a second lower plate portion formed below the second upper plate portion;
the second upper plate portion is connected to an end of the connection portion; and
the second lower plate portion is connected to the second support portion.

8. The fixing assembly of claim 1, wherein the side extension portion further includes a strength reinforcing portion which is formed to be bent upward, prevents deformation of the side extension portion, and serves as a stopper in contact with the fixed rail in a separating process.

* * * * *